(12) United States Patent
Jaegy

(10) Patent No.: US 12,134,879 B2
(45) Date of Patent: Nov. 5, 2024

(54) METHOD OF DETERMINING AN ANGLE OF A TOOL OF A MACHINE

(71) Applicant: LIEBHERR-MINING EQUIPMENT COLMAR SAS, Colmar (FR)

(72) Inventor: Adrien Jaegy, Ungersheim (FR)

(73) Assignee: LIEBHERR-MINING EQUIPMENT COLMAR SAS, Colmar (FR)

( * ) Notice: Subject to any disclaimer, the term of this patent is extended or adjusted under 35 U.S.C. 154(b) by 935 days.

(21) Appl. No.: 17/263,136

(22) PCT Filed: Jul. 26, 2019

(86) PCT No.: PCT/EP2019/070168
§ 371 (c)(1),
(2) Date: Jan. 25, 2021

(87) PCT Pub. No.: WO2020/021059
PCT Pub. Date: Jan. 30, 2020

(65) Prior Publication Data
US 2021/0180296 A1    Jun. 17, 2021

(30) Foreign Application Priority Data
Jul. 26, 2018 (DE) ............... 10 2018 118 147.7

(51) Int. Cl.
*E02F 9/26* (2006.01)
*E02F 3/30* (2006.01)
*G01B 21/22* (2006.01)
*G01P 3/44* (2006.01)

(52) U.S. Cl.
CPC ............. *E02F 9/264* (2013.01); *E02F 3/308* (2013.01); *G01B 21/22* (2013.01); *G01P 3/44* (2013.01)

(58) Field of Classification Search
CPC ..... E02F 9/264; E02F 9/20; E02F 9/26; E02F 9/265; E02F 3/30; E02F 3/308;
(Continued)

(56) References Cited

U.S. PATENT DOCUMENTS 9,618,338 B2   4/2017  Fehr
2009/0312974 A1  12/2009  Douglas
(Continued)

FOREIGN PATENT DOCUMENTS

CN    102198833 A    9/2011
CN    105339561 A    2/2016
(Continued)

OTHER PUBLICATIONS

China National Intellectual Property Administration, Office Action and Search Report Issued in Application No. 201980049928.X, Mar. 8, 2022, 25 pages.
(Continued)

*Primary Examiner* — Son T Le
*Assistant Examiner* — Matthew W. Baca
(74) *Attorney, Agent, or Firm* — McCoy Russell LLP

(57) ABSTRACT

The present invention relates to a method of determining an angle of a piece of working equipment of a machine, wherein the machine has an undercarriage and a superstructure rotatable with respect thereto, wherein the piece of working equipment is fastened to the superstructure via a swivel joint such that the angle of rotation of the swivel joint is orthogonal to the axis of rotation of the rotatable superstructure, wherein the piece of working equipment is provided with an IMU, that is in an inertial measurement unit, that is configured to detect an angular speed in three spatial directions that are preferably perpendicular to one another, and wherein a first of the three spatial directions, whose angular speed ($\dot{\theta}_y$) is detectable by the IMU is in parallel (Continued)

with the axis of rotation of the swivel joint. The method is characterised in that an angular speed ($\dot{\theta}t_z$) that occurs on a rotation of the superstructure is detected by the IMU and an angle of the piece of working equipment relative to the axis of rotation of the superstructure is determined on the basis of the detected angular speed ($\dot{\theta}t_z$) of the superstructure.

17 Claims, 3 Drawing Sheets

(58) Field of Classification Search
CPC ....... E02F 3/32; E02F 3/42; E02F 3/43; E02F 3/435; E02F 5/145; G01B 21/22; G01P 3/44; G01C 9/08
See application file for complete search history.

(56) References Cited

U.S. PATENT DOCUMENTS

| | | |
|---|---|---|
| 2014/0016809 A1 | 1/2014 | Van Doorn |
| 2016/0237655 A1 | 8/2016 | Baba et al. |
| 2017/0218595 A1 | 8/2017 | Padilla |
| 2017/0321395 A1 | 11/2017 | Kanemitsu |
| 2018/0171579 A1* | 6/2018 | Howell ................... E02F 9/264 |
| 2018/0171580 A1 | 6/2018 | Howell et al. |
| 2018/0298593 A1* | 10/2018 | Dusha ..................... E02F 3/431 |
| 2019/0338490 A1* | 11/2019 | Roulston ................ E02F 9/264 |

FOREIGN PATENT DOCUMENTS

| | | |
|---|---|---|
| CN | 107268699 A | 10/2017 |
| DE | 102016014759 A1 | 6/2018 |
| EP | 3235961 A1 | 10/2017 |
| WO | 2016164975 A1 | 10/2016 |

OTHER PUBLICATIONS

ISA European Patent Office, International Search Report Issued in Application No. PCT/EP2019/070168, Oct. 16, 2019, WIPO, 6 pages.

* cited by examiner

METHOD OF DETERMINING AN ANGLE OF A TOOL OF A MACHINE

CROSS REFERENCE TO RELATED APPLICATIONS

The present application is a U.S. National Phase of International Application No. PCT/EP2019/070168 entitled "METHOD FOR DETERMINING AN ANGLE OF A TOOL OF A MACHINE," and filed on Jul. 26, 2019. International Application No. PCT/EP2019/070168 claims priority to German Patent Application No. 10 2018 118 147.7 filed on Jul. 26, 2018. The entire contents of each of the above-listed applications are hereby incorporated by reference for all purposes.

TECHNICAL FIELD

The present invention relates to a method of determining an angle of a piece of working equipment of a machine and to a corresponding machine. For work machines, in particular for excavators, it is of advantage if they can exactly determine the angle of a piece of working equipment or the angles of the excavator arm elements. Different ways of determining such an angle are known from the prior art, but none of them can be integrated in a robust, inexpensive, precise, and simple manner. It is also desirable in this connection if an implementation for determining an angle of a piece of working equipment can also be easily retrofitted.

BACKGROUND AND SUMMARY

The angle calculation with the aid of inertial measurement units (IMUs) in this respect does not satisfy all the above-named criteria since their accuracy drops at high speeds. In addition, special influences act for work machines, in particular for excavators, so that inertial navigation systems such as are used in aircraft or also in passenger vehicles cannot easily be used.

An IMU, inertial measurement unit, is typically nevertheless made use of that is then used to measure an acceleration along three axes. Gravitational force here represents a vertical acceleration and can therefore be measured by means of an IMU. If the position of this gravitational force is observed from its projection onto the three axes of the accelerometer, it is possible to derive the angle of the IMU with respect to a vertical. Such a procedure is described, for example, in U.S. Pat. No. 9,618,338 B2. It is therefore possible by the installation of IMUs on the piece of working equipment to determine the angle of the piece of working equipment more or less exactly.

It is problematic with this that as soon as a movement occurs, for example a superstructure rotation of an excavator or of another construction machine, centrifugal forces also come into play in addition to the accelerations measured by the IMU. The calculation of the angle is therefore defective since the projected force is no longer only vertical, but rather represents a combination of the gravitational force and the centrifugal forces. It is known from the prior art to compensate these effects to utilize a geometrical model of the machine or of the excavator to estimate the centrifugal forces at the sensors in real time and to take them into account in the calculation of the orientation of the vertical gravitational force. Such a procedure is disclosed, for example, in AR 10 4232 A1 that admittedly produces relatively reliable results, but only at the cost that the geometrical model of the machine, or of the excavator, has to be prepared and simulated with all of its lengths and distances and with the positions of the plurality of IMUs. In addition, this solution requires a more or less complex calibration phase.

It is further also known from the prior art to filter the dynamic effects (centrifugal force, etc.), for example using a Kalman filter or a combination of a high pass and low pass filter. The dynamic effects due to a movement of the piece of working equipment or of the vehicle can thereby be alleviated. This implementation does not, however, produce the desired exact solution in all cases. All the processes available on the market are furthermore configured such that they require an initial calibration that takes up additional resources.

In summary, it can be stated that existing processes are directed to alleviating the unwanted effects of the centrifugal forces, in particular on a rotation of a superstructure, to amplify the accuracy of the measurement principle used.

It is the aim of the present invention to provide an angular determination of a piece of working equipment that overcomes the above-listed disadvantages. This is done using a method that has all the features of claim 1 or using a machine that has all the features of claim 9.

Advantageous aspects are listed in the dependent claims here.

The invention relates to a method of determining an angle of a piece of working equipment of a machine, in particular of an excavator, wherein the machine has an undercarriage and a superstructure rotatable with respect thereto, wherein the piece of working equipment is fastened to the superstructure via a swivel joint such that the axis of rotation of the swivel joint is orthogonal to the axis of rotation of the rotatable superstructure, wherein the piece of working equipment is provided with an IMU, that is with an inertial measurement unit, that is configured to detect an angular speed in three spatial directions that are preferably perpendicular to one another, and wherein a first of the three spatial directions whose angular speed is detectable by the IMU is in parallel with the axis of rotation of the swivel joint. The method is characterized in that an angular speed that occurs on a rotation of the superstructure is detected by the IMU and an angle of the piece of working equipment relative to the axis of rotation of the superstructure is determined on the basis of the detected angular speed of the superstructure.

Unlike the already known approaches for determining the angle of the piece of working equipment, the present invention does not try to suppress the effects of a rotation of the superstructure, but rather uses its characteristics for the angle determination.

On a closer observation, the rotation of the superstructure is an angular speed that constantly indicates upward (or downward) when the point of view of the machine or of the excavator is adopted. The angular speed or the vector of the angular speed is here always perpendicular to the plane defined by the rotation of the superstructure. The gyrometers of the IMU, that is those devices that detect the angular speed for a respective spatial direction, are arranged here such that two of them are orthogonal to the axis of rotation of the swivel joint of the piece of working equipment. Finally, a first one of the three spatial directions whose angular speed is detected by the IMU is in parallel with the axis of rotation of the swivel joint so that the other two spatial directions have to be orthogonal thereto. With the aid of the two spatial directions that are arranged orthogonal to the axis of rotation and whose angular speed can be detected with the aid of the IMUs, the projection of the angular speed that is caused by a rotation of the superstructure can now be precisely measured. It is therefore possible to precisely determine the angle of a piece of working equipment at which an IMU is mounted with respect to the axis of rotation of the superstructure while using the measured angular speeds.

In accordance with an optional modification of the present invention, the angular speed occurring on a rotation of the superstructure is reflected in the angular speeds of the two spatial directions of the IMU that differ from the first one of the three spatial directions so that the angle of the piece of working equipment can be determined from it.

The two angular speeds of the IMU for the spatial directions that differ from the first one of the three spatial directions are preferably to be used as arguments for the mathematical function a tan 2 to determine the angle of the piece of working equipment. The function a tan 2, also called arctan 2, is an extension of the inverse angular function arc tangent and takes two real numbers as arguments so that unlike the normal arc tangent it has sufficient information to be able to output the functional value in a value range of 360°. The fact is thus consequently also covered by the invention that the angular speeds are used to determine the angle of an arc tangent function dependent on the case.

In accordance with a preferred embodiment, the angle of the piece of working equipment is determined using the formula:

$$\alpha_G = a\tan 2(\sin(\dot{\theta}t_z)\cdot\dot{\theta}_x; \sin(\dot{\theta}t_z)\cdot\dot{\theta}_z)$$

where $\alpha_G$ is the angle of the piece of working equipment relative to a direction of rotation axis of the superstructure, $\dot{\theta}t_z$ is the angular speed of a rotation of the superstructure, $\dot{\theta}_x$ is the angular speed detected by the IMU in a second one of the three spatial directions, and $\dot{\theta}_z$ is the angular speed detected by the IMU in a third one of the three spatial directions.

Provision can furthermore be made in accordance with a further development of the invention that the angle of the piece of working equipment is only determined on the basis of the angular speed of a rotation of the superstructure when the angular speed is above a threshold value.

Provision can furthermore be made that when the angular speed of a rotation of the superstructure is below the threshold value or is at the threshold value, the angle of the piece of working equipment is determined via an alternative process, preferably based on an acceleration detected by the IMU.

Provision can additionally be made that a weighting can be provided to determine the angle of the piece of working equipment and that a determination on the basis of the angular speed is provided with a weighting factor that varies in dependence on the angular speed of a rotation of the superstructure. The weighting factor can, for example, thus adopt a large value when the angular speed of the rotation of the superstructure is large and can be low when the angular speed of the rotation of the superstructure is low.

The invention further comprises a machine having: an undercarriage, a superstructure rotatable with respect to the undercarriage, a piece of working equipment that is fastened to the superstructure via a swivel joint such that the axis of rotation of the swivel joint is orthogonal to the axis of rotation of the rotatable superstructure, and an IMU, that is an inertial measurement unit, that is provided in the piece of working equipment and that is configured to detect an angular speed in three spatial directions, wherein a first one of the three spatial directions whose angular speed can be detected by the IMU is in parallel with the axis of rotation of the swivel joint. The machine is characterized in that an angle determination unit for determining an angle of the piece of working equipment relative to the axis of rotation of the superstructure is provided, with the angle determination unit being configured to determine the angle of the piece of working equipment on the basis of the angular speed detected by the IMU and occurring on a rotation of the superstructure.

Analogously to the subject matter of claim 1, the idea is again utilized that the vector of the angular speed is orthogonal to the plane defined by the rotation so that that angular speed sensor that detects the spatial direction that is in parallel with the axis of rotation of the swivel joint does not record any deflection on a rotation of the superstructure. This is due to the fact that the axis of rotation and the spatial direction extending in parallel therewith are arranged perpendicular to the axis of rotation of the rotatable superstructure. As a result, the angular speed that results from a rotation of the superstructure is therefore mapped in the two other angular speed sensors of the other spatial directions so that a location of the IMU and of the piece of working equipment fixedly connected thereto can be derived.

It is preferably clarified that the spatial directions detected by the IMU are orthogonal to one another.

In accordance with an advantageous embodiment of the invention, the angular speed occurring on a rotation of the superstructure is reflected in the angular speeds of the two spatial directions of the IMU that differ from the first one of the three spatial directions, with the angle determination unit being configured to determine the angle of the piece of working equipment therefrom.

The angle determination unit of the machine is preferably configured to determine the two angular speeds for the spatial directions that differ from the first one of the three spatial directions as arguments for the mathematical function a tan 2 to determine the angle of the piece of working equipment. In accordance with a preferred implementation, this is done using the formula:

$$\alpha_G = a\tan 2(\sin(\dot{\theta}t_z)\cdot\dot{\theta}_x; \sin(\dot{\theta}t_z)\cdot\dot{\theta}_z),$$

where $\alpha_G$ is the angle of the piece of working equipment relative to a direction of rotation axis of the superstructure, $\dot{\theta}t_z$ is the angular speed of a rotation of the superstructure, $\dot{\theta}_x$ is the angular speed detected by the IMU in a second one of the three spatial directions, and $\dot{\theta}_z$ is the angular speed detected by the IMU in a third one of the three spatial directions.

Provision can furthermore be made that the angle determination unit is configured only to determine the angle of the piece of working equipment on the basis of the angular speed of a rotation of the superstructure when the angular speed is above a threshold value and to determine the angle of the piece of working equipment via an alternative method, preferably on the basis of an acceleration detected by the IMU, when the angular speed of a rotation of the superstructure is below the threshold value or at the threshold value.

In accordance with an optional modification of the invention, the machine is an excavator and the piece of working equipment is an excavator arm that has an excavator bucket, an excavator stick, and an excavator boom, with the IMU being arranged at at least one of the elements of the excavator arm to determine an angle of the respective element of the excavator arm.

Provision can furthermore also be made that a respective IMU is provided at the excavator bucket, at the excavator stick, and at the excavator boom, said IMUs preferably being connected to the angle determination unit via a data line. This angle determination unit can then be configured to calculate or derive the angle of every element having its own IMU In accordance with an advantageous modification of the invention, the elements of the excavator arm are connected to one another via swivel joints whose axes of rotation are in parallel with one another and thus all stand perpendicular on the axis of rotation of a superstructure rotation.

Provision can furthermore be made that the angle determination unit is part of an electronic control unit that is connected to the control of the machine.

BRIEF DESCRIPTION OF THE FIGURES

Further advantages, details, and features of the present invention will become clear with reference to the following description of the Figures. There are shown.

DETAILED DESCRIPTION

Figure 1:
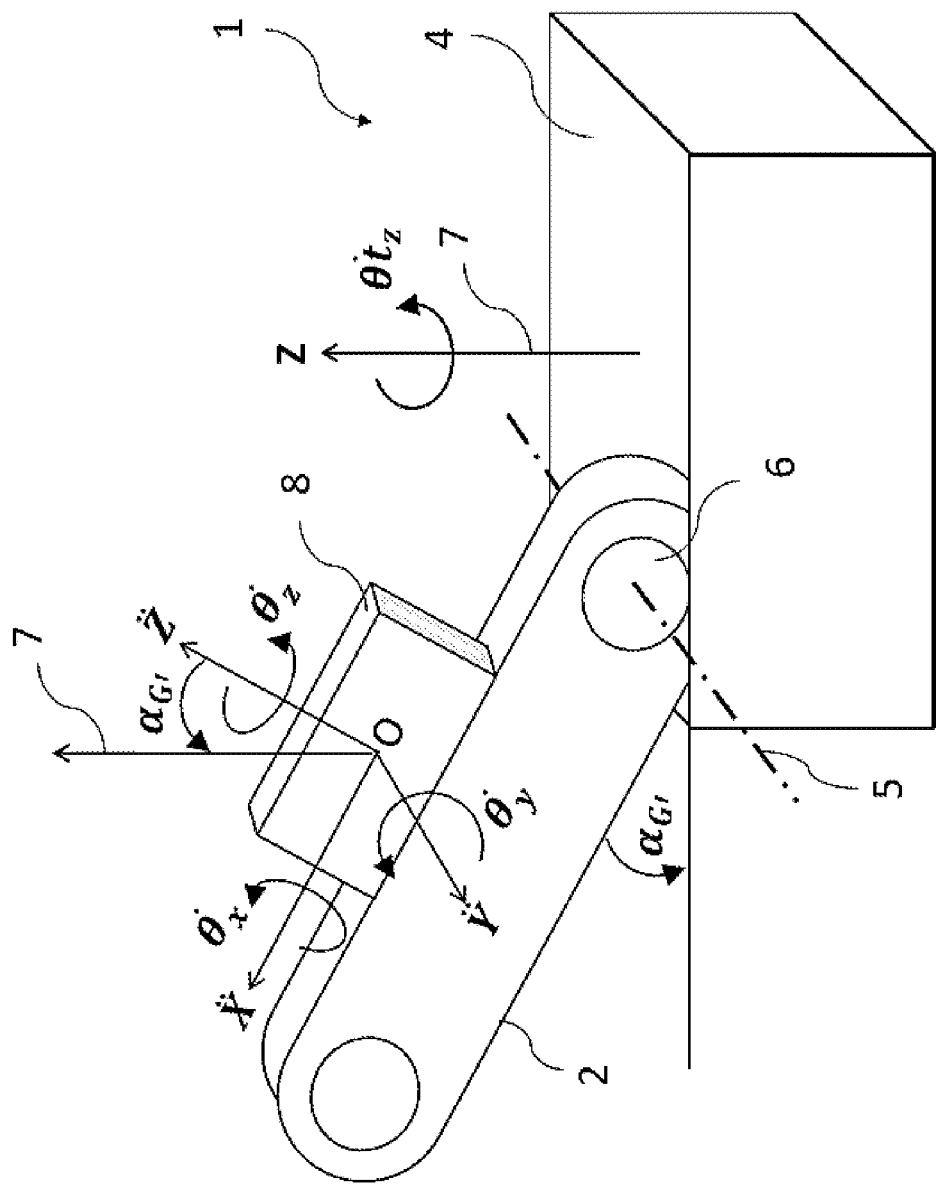
FIG. 1: a schematic representation of a machine with a piece of working equipment that is provided with an IMU.

FIG. 1 here shows a schematic representation of the invention. The machine 1 can be recognized that is shown schematically only by the superstructure 4 and a piece of working equipment 2, for example an excavator boom, fastened thereto.

An IMU 8 that can detect an angular speed in three spatial directions is fixedly installed at the excavator boom 2. These three spatial directions are orthogonal to one another, with one of the three spatial directions being in parallel with the axis of rotation 5 of the swivel joint 6 by which the piece of working equipment 2 is pivotably arranged at the superstructure 4 of the machine 1. The swivel joint 6 can here correspond to a hinged joint. If the superstructure 4 now rotates about the axis of rotation 7 shown in FIG. 1 at the speed ($\dot{\theta}t_z$), this results in an angular speed whose vector is oriented in parallel with the axis of rotation 7. The corresponding vector can naturally also extend in the opposite sense to the arrow of the axis of rotation 7. The IMU gyrometers, that is those elements that detect the angular speed that are arranged orthogonal to the axis of rotation 5 of the swivel joint 6 can then precisely measure the projections of the angular speed. This is primarily done at the angular speeds ($\dot{\theta}_x$, $\dot{\theta}_z$). It is therefore possible to determine the angle of a piece of working equipment or of an IMU 8 connected to the piece of working equipment in which reference is made to the axis of rotation of the superstructure 4 while using these two speeds ($\dot{\theta}_x$, $\dot{\theta}_z$). In the simplest implementation, the calculation can be formed by:

$$\alpha_G = a\tan 2(\text{sign}(\dot{\theta}t_z)\cdot\dot{\theta}_x; \text{sign}(\dot{\theta}t_z)\cdot\dot{\theta}_z)$$

where $\alpha_G$ is the angle of the piece of working equipment relative to a direction of rotation axis of the superstructure, $\dot{\theta}t_z$ is the angular speed of a rotation of the superstructure, $\dot{\theta}_x$ is the angular speed detected by the IMU in a second one of the three spatial directions, and $\dot{\theta}_z$ is the angular speed detected by the IMU in a third one of the three spatial directions.

The procedure is rather similar to a method of localizing the gravity in the accelerometers, but the same physical values are not observed here since it is the aim in the present case to find the rotational speed of the superstructure in the gyrometer measurements. This approach was not pursued in any prior art available up to the date of application.

This is advantageous since there are no parasitic speeds that can interfere with the calculations. This is due to the fact that the rotational speed of the superstructure is perpendicular to the swivel joint 6 of a piece of working equipment 2. In addition, the gyrometers are not disturbed by blows and vibrations so that a reading of the relevant data can take place more simply than a reading of accelerations and accordingly also requires less filtering.

It is accordingly possible during a work cycle of the machine using the invention to precisely determine the angles of the piece of working equipment while making use of the idea explained in the present case independently of any dynamic speeds with respect to the swivel joint 6 of the piece of working equipment 2.

To also be able to determine an angle of the piece of working equipment 2 when the superstructure 4 does not perform any rotation, it is necessary to provide a fusion algorithm for a plurality of data sources, said fusion algorithm determining an angle, on the one hand, from accelerometer measurement units (conventional kind of angle determination) and, on the other hand, from gyrometers, that is angular speed measurement units when there is a superstructure rotational speed. In addition, a gyroscopic integration of collinear gyrometers at the swivel joints or at the swivel joint 6 can be provided.

Figure 3:
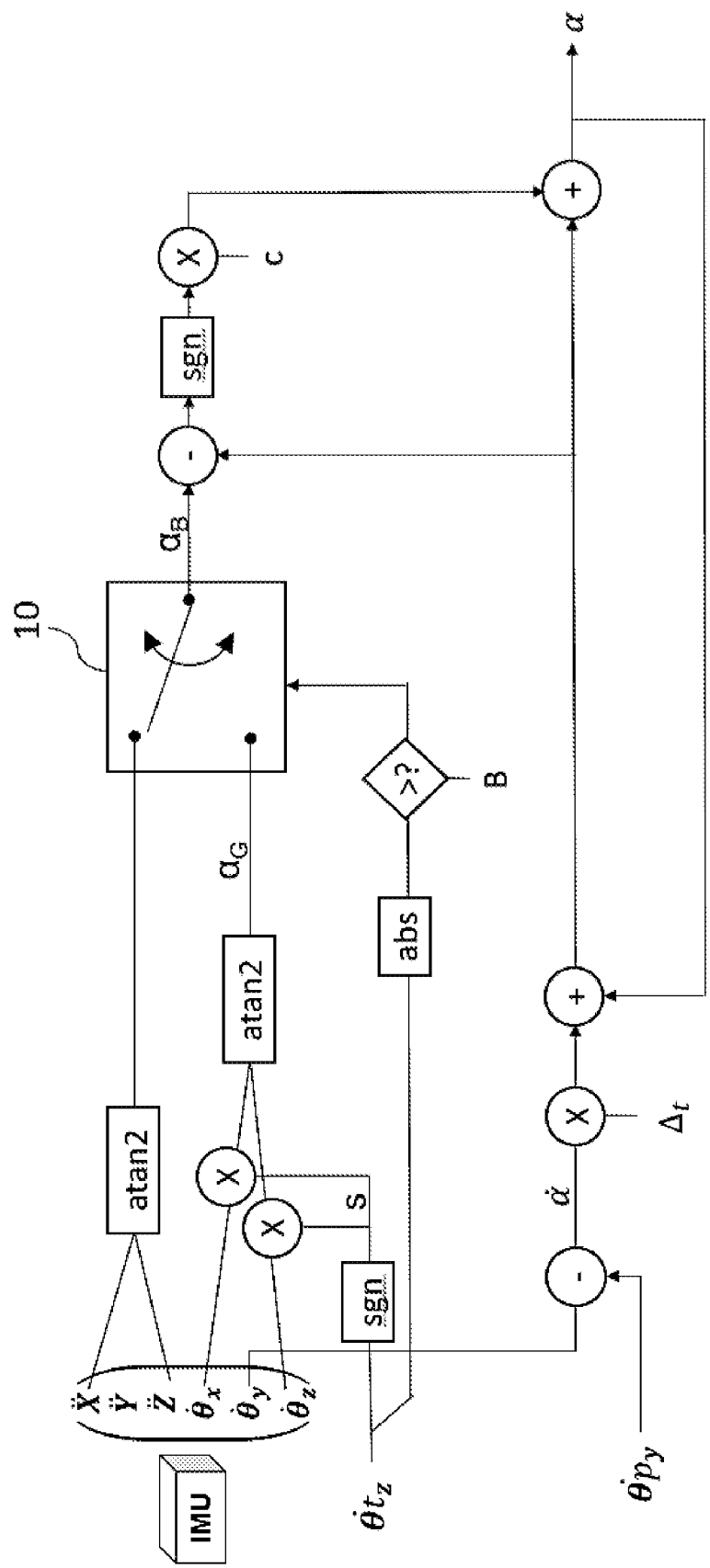
FIG. 3: an implementation of the method in accordance with the invention in an abstract illustration.

In this respect, one of a plurality of possibilities for the implementation is shown in FIG. 3, wherein the rotational speed of the superstructure is compared with a threshold value B and, when the speed is below a threshold value, the calculation of a raw angle $\alpha_B$ is performed in a conventional manner from the acceleration measurement units and, when the speed exceeds or reaches the threshold value, the raw angle $\alpha_B$ is calculated from the gyrometers. Provision can also be made here that the raw angle $\alpha_B$ is smoothed with the aid of a collinear gyrometer at the swivel joint. If, for example, $\alpha(t)$ is the angle obtained at the time t, the angle at the time $\alpha(t+1)$ can be calculated by $\alpha(t)+\dot{\alpha}\Delta_t+c(-1)^x$, where $\dot{\alpha}$ is the relative angular speed, $\Delta_t$ is the time step, c is a coefficient, and x=0 if the preceding angle is smaller than the raw angle $\alpha_B$, or x=1 if the opposite is the case.

A complete implementation can be found in FIG. 3 in which a switching unit 10 varies the basis for calculating the angle in dependence on the speed of a rotation of the superstructure. In the position of the switching unit 10 shown, the angle is calculated in a conventional manner on the basis of the acceleration. Alternatively to this, it is possible to calculate the angle with the aid of the speeds, with this only being done when the superstructure rotation has reached a certain speed. $\theta\dot{p}_y$ here represents the angular speed measured by the IMU that leads in a kinematic chain.

Figure 2:
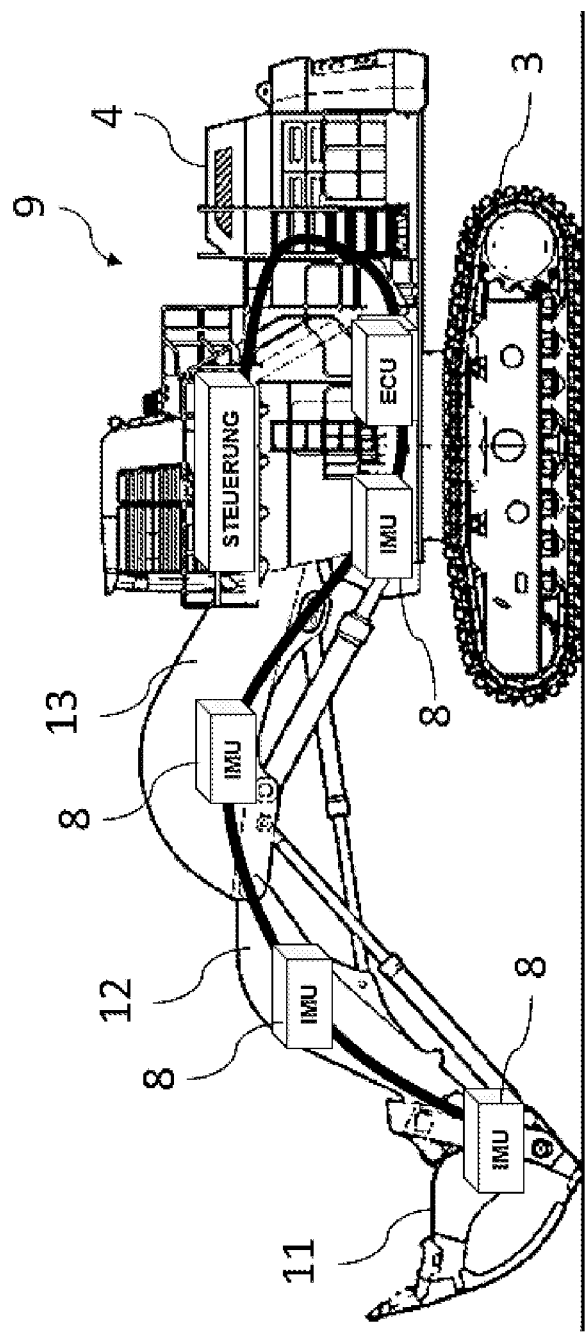
FIG. 2: a side view of a mine excavator with different arrangement positions of different IMUs.

A complete system that shows the advantages of the method in accordance with the invention can be assembled as shown in FIG. 2. An IMU is provided both at the excavator bucket 11 and at the excavator stick 12 and at the excavator boom 13. A further IMU 8 is also provided at the superstructure 4. These four IMUs transmit their raw data (accelerations and angular speeds) to an electronic unit (ECU) that contains the algorithms for calculating the relative angles between every part of the excavator arm or of the superstructure. This means a calculation of the excavator bucket angle, of the excavator stick angle, of the excavator boom angle, and a superstructure angle of tilt and a superstructure roll angle. The electronic control unit ECU can also calculate all the relative speeds linked to these angles.

Provision can furthermore be made that this control unit is in communication connection with excavator electronics that provide all the data via a suitable bus. This is shown by a control box (steering) in the drawing.

The invention claimed is:

1. A method of determining an angle of a piece of working equipment of a machine, wherein
the machine has an undercarriage and a superstructure rotatable with respect thereto;
the piece of working equipment is fastened to the superstructure via a swivel joint such that an axis of rotation of the swivel joint is orthogonal to the axis of rotation of a rotatable superstructure;
the piece of working equipment is provided with an inertial measurement unit (IMU), that is configured to detect an angular speed in three spatial directions (x, y, z), wherein the IMU is positioned such that a first one of the three spatial directions (y) in which angular speed ($\dot{\theta}_y$) is detectable by the IMU is fixedly aligned with and parallel to the axis of rotation of the swivel joint;
the IMU measures an angular speed ($\dot{\theta}t_z$) of a rotation of the superstructure; and
an angle of the piece of working equipment relative to the axis of rotation of the rotatable superstructure is determined based on the detected superstructure angular speed ($\dot{\theta}t_z$); and
the method further comprising measuring, by the IMU, angular speeds ($\dot{\theta}_x$, $\dot{\theta}_z$) of each of a second and a third spatial direction (x,z) of the three spatial directions (x,y,z), wherein the second and the third spatial directions (x,z) each differ from the first one of the three spatial directions (y), and wherein the angle of the piece of working equipment is determined from the measured angular speeds ($\dot{\theta}_x$, $\dot{\theta}_z$) of the two spatial directions (x,z).

2. The method in accordance with claim 1, wherein the angular speeds ($\dot{\theta}_x$, $\dot{\theta}_z$) measured by the IMU for the second and the third spatial directions are used as arguments for a mathematical function a tan 2 to determine the angle of the piece of working equipment.

3. The method in accordance with claim 1, wherein the angle of the piece of working equipment is determined using the formula:

$$\alpha_G = a\tan 2(\sin(\dot{\theta}t_z)\cdot\dot{\theta}_x; \sin(\dot{\theta}t_z)\cdot\dot{\theta}_z)$$

wherein
$\alpha_G$ is the angle of the piece of working equipment relative to a direction of rotation axis of the superstructure;
$\dot{\theta}t_z$ is the angular speed of a rotation of the superstructure;
$\dot{\theta}_x$ is the angular speed detected by the IMU in the second spatial direction; and
$\dot{\theta}_z$ is the angular speed detected by the IMU in the third spatial direction.

4. The method in accordance with claim 1, wherein the angle of the piece of working equipment is determined on the basis of the angular speed ($\dot{\theta}t_z$) of a rotation of the superstructure in response to determining that the angular speed ($\dot{\theta}t_z$) is above a threshold value.

5. The method in accordance with claim 4, wherein the angle of the piece of working equipment is determined via an alternative method in response to determining that the angular speed ($\dot{\theta}t_z$) of a rotation of the superstructure is below the threshold value or at the threshold value.

6. The method of claim 5, wherein the alternative method comprises determining the angle of the piece of working equipment based on an acceleration detected by the IMU.

7. A machine, comprising:
an undercarriage;
a superstructure rotatable with respect to the undercarriage;
a piece of working equipment that is fastened to the superstructure via a swivel joint such that an axis of rotation of the swivel joint is orthogonal to an axis of rotation of the rotatable superstructure; and
an inertial measurement unit (IMU), that is provided at the piece of working equipment and that is configured to detect an angular speed in three spatial directions (x, y, z), wherein the IMU is positioned such that a first one of the three spatial directions (y) in which angular speed ($\dot{\theta}_y$) is detectable by the IMU is aligned with and in parallel with the axis of rotation of the swivel joint, wherein
an angle determination unit for determining an angle of the piece of working equipment relative to the axis of rotation of the superstructure, with
the angle determination unit being configured to determine the angle of the piece of working equipment on the basis of the angular speed ($\dot{\theta}t_z$) detected by the IMU of a rotation of the superstructure; and
wherein the IMU is configured to detect angular speeds ($\dot{\theta}_x$, $\dot{\theta}_z$) of a second and a third spatial direction (x,z) of the three spatial directions, wherein the second and the third spatial directions differ from the first one of the three spatial directions (y) wherein the angular speeds ($\dot{\theta}_x$, $\dot{\theta}_z$) of the two spatial directions (x,z) are measured by the IMU, and wherein the angle of the piece of working equipment is determined from the measured angular speeds ($\dot{\theta}_x$, $\dot{\theta}_z$) of the two spatial directions (x,z).

8. The machine in accordance with claim 7, wherein the angle determination unit is part of an electronic control unit that is connected to a control of the machine.

9. The machine in accordance with claim 7, wherein the spatial directions detected by the IMU are orthogonal to one another.

10. The machine in accordance with claim 7, wherein the angle determination unit is configured to use the angular speeds ($\dot{\theta}_x$, $\dot{\theta}_z$) for the second and the third spatial directions (x,z) as an argument for the mathematical function a tan 2 to determine the angle of the piece of working equipment.

11. The machine of claim 10, wherein the angle of the piece of working equipment, is determined using the formula:

$$\alpha_G = a\tan 2(\sin(\dot{\theta}t_z)\cdot\dot{\theta}_x; \sin(\dot{\theta}t_z)\cdot\dot{\theta}_z), \text{ where}$$

$\alpha_G$ is the angle of the piece of working equipment relative to a direction of rotation axis of the superstructure;
$\dot{\theta}t_z$ is the angular speed of a rotation of the superstructure;
$\dot{\theta}_x$ is the angular speed detected by the IMU in the second spatial direction; and
$\dot{\theta}_z$ is the angular speed detected by the IMU in the third spatial direction.

12. The machine in accordance with claim 7, wherein the angle determination unit is configured to determine the angle of the piece of working equipment on the basis of the angular speed ($\dot{\theta}t_z$) of a rotation of the superstructure when the angular speed ($\dot{\theta}t_z$) is above a threshold value and wherein the angle determination unit is configured to determine the angle of the piece of working equipment via an alternative method when the angular speed ($\dot{\theta}t_z$) is less than or equal to the threshold value.

13. The machine of claim 12, wherein the alternative method determines the angle of the piece of working equipment based on an acceleration detected by the IMU when the angular speed of the rotation of the superstructure is below the threshold value or at the threshold value.

14. The machine in accordance with claim 7, wherein the machine is an excavator and the piece of working equipment is an excavator arm that has an excavator bucket, an excavator stick, and an excavator boom, wherein the IMU is arranged at at least one of the elements of the excavator arm to determine an angle of the corresponding element of the excavator arm.

15. The machine in accordance with claim 14, wherein a respective IMU is provided at the superstructure, at the excavator bucket, at the excavator stick, and at the excavator boom, said IMUs being connected to the angle determination unit via a data line.

16. The machine in accordance with claim 14, wherein the elements of the excavator arm are connected to one another via swivel joints whose axes of rotation are in parallel with one another and thus all stand perpendicular on the axis of rotation of a superstructure rotation.

17. A method of determining an angle of a piece of working equipment of a machine, wherein the machine has an undercarriage and a superstructure rotatable with respect thereto;

wherein the piece of working equipment is fastened to the superstructure via a swivel joint such that an axis of rotation of the swivel joint is orthogonal to the axis of rotation of a rotatable superstructure;

wherein the piece of working equipment is provided with an inertial measurement unit (IMU), that is configured to detect an angular speed in three spatial directions (x, y, z), wherein the IMU is positioned such that a first one of the three spatial directions (y) in which angular speed ($\dot{\theta}_y$) is detectable by the IMU is fixedly aligned with and parallel to the axis of rotation of the swivel joint;

wherein the IMU measures an angular speed ($\dot{\theta}t_z$) of a rotation of the superstructure;

wherein an angle of the piece of working equipment relative to the axis of rotation of the rotatable superstructure is determined based on the detected superstructure angular speed ($\dot{\theta}t_z$); and wherein the angular speeds ($\dot{\theta}_x$, $\dot{\theta}_z$) measured by the IMU for the second and the third spatial directions are used as arguments for a mathematical function a tan 2 to determine the angle of the piece of working equipment.

* * * * *